US008075058B2

(12) United States Patent
Baumann

(10) Patent No.: US 8,075,058 B2
(45) Date of Patent: Dec. 13, 2011

(54) SEAT

(75) Inventor: Jürgen Baumann, Ludwigshafen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 5 days.

(21) Appl. No.: 11/884,937

(22) PCT Filed: Feb. 14, 2006

(86) PCT No.: PCT/EP2006/001317
§ 371 (c)(1),
(2), (4) Date: Aug. 19, 2008

(87) PCT Pub. No.: WO2006/092205
PCT Pub. Date: Sep. 8, 2006

(65) Prior Publication Data
US 2009/0015047 A1    Jan. 15, 2009

(30) Foreign Application Priority Data
Mar. 2, 2005   (DE) .......................... 10 2005 009 419

(51) Int. Cl.
*A47C 1/00*   (2006.01)

(52) U.S. Cl. ...................... 297/342; 297/300.2; 297/321

(58) Field of Classification Search ............... 297/300.2, 297/342, 344.15, 321
See application file for complete search history.

(56) References Cited

U.S. PATENT DOCUMENTS

| 2,494,779 A * | 1/1950 | Prosser et al. ................ 297/342 |
| 2,509,739 A * | 5/1950 | McDonald ..................... 297/331 |
| 3,092,415 A * | 6/1963 | Schliephacke ................. 297/89 |
| 3,394,965 A * | 7/1968 | Fletcher ........................ 297/321 |
| 4,411,469 A * | 10/1983 | Drabert et al. ............. 297/300.2 |
| 4,966,411 A * | 10/1990 | Katagiri et al. ............ 297/300.7 |
| 5,584,533 A * | 12/1996 | Schrewe .................... 297/300.2 |
| 5,733,005 A * | 3/1998 | Aufrere et al. ................ 297/340 |
| 5,979,985 A * | 11/1999 | Bauer et al. .................... 297/340 |
| 6,886,888 B2 * | 5/2005 | Bock ........................... 297/300.2 |
| 7,455,360 B2 * | 11/2008 | White et al. .................. 297/330 |

FOREIGN PATENT DOCUMENTS

| DE | 36 38 231 | 5/1988 |
| DE | 297 07 003 | 6/1997 |
| DE | 197 24 763 | 12/1998 |
| DE | 100 64 574 | 1/2002 |
| EP | 0 017 253 | 10/1980 |
| EP | 0 302 427 | 2/1989 |

(Continued)

*Primary Examiner* — David Dunn
*Assistant Examiner* — David E Allred
(74) *Attorney, Agent, or Firm* — Posz Law Group, PLC

(57) ABSTRACT

The invention relates to a seat, in particular, a vehicle or aircraft passenger seat with seat components such as a seat base (12), a backrest (14) and a coupling device (16) for coupling the movement of at least one part of the seat components between an exit (I) and at least one comfortable (II) position and vice versa. According to the invention, the coupling device (16) comprises at least one control piece, which may be controlled using the movement of the backrest (14) and/or the seat base (12) and hence by means of at least one further control piece to move the seat base (12) and/or the backrest (14) between said positions (I, II), whereby an adjustment, in particular, tilting movement of the backrest is linked with a simultaneous adjustment movement of the seat base which, preferably in the rearward transition region into the backrest descends by a given amount relative to the front edge of the seat which simultaneously moves forward to increase the seat depth.

11 Claims, 2 Drawing Sheets

FOREIGN PATENT DOCUMENTS

Figure 1:
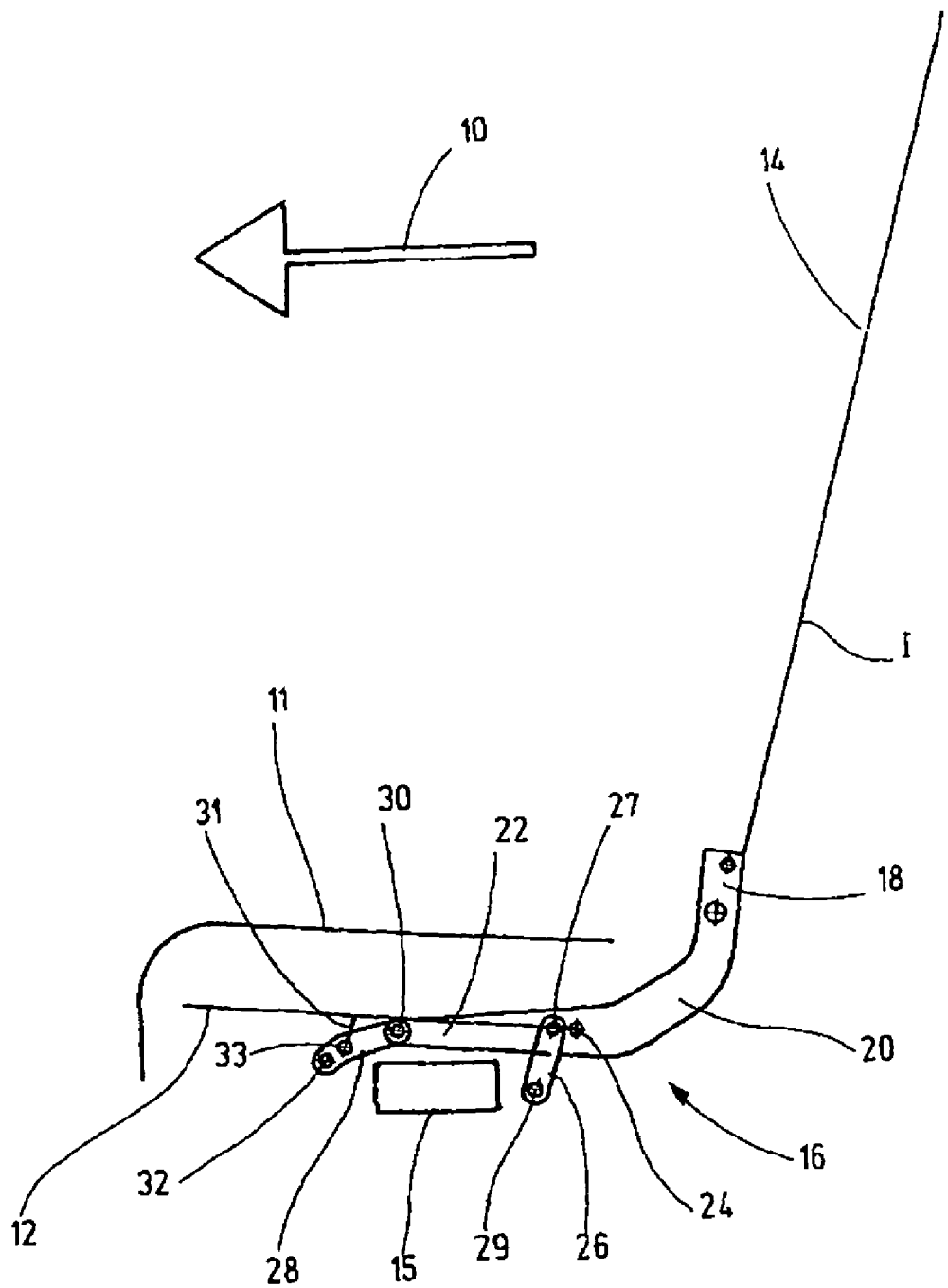

| | | |
|---|---|---|
| EP | 1 074 468 | 2/2001 |
| EP | 1 216 879 | 6/2002 |
| EP | 1 234 763 | 8/2002 |
| GB | 1 278 501 | 6/1972 |
| GB | 2 016 915 | 10/1979 |
| GB | 2 292 676 | 3/1996 |

* cited by examiner

SEAT

The invention relates to a seat, especially a vehicle or aircraft passenger seat, having seat components such as a seat base, a backrest and a coupling means for coupling the movement of at least one part of the seat components between an initial position and a comfort position and vice versa.

Prolonged sitting, as occurs for example with long distance travel or long distance flights, depending on the configuration of the respective seat, constitutes a significant limitation of comfort for the respective passenger. As a result of comfort and ergonomic requirements which have not adequately been taken into account, mainly relating to seats which are assigned to economy class in aircraft, for the respective seat occupant fatigue, muscle cramps or even circulatory failure can occur.

On the basis of this prior art, therefore the object of the invention is to improve further the known solutions such that at a low price level an ergonomically improved seat is devised which is reliable in use and in this way especially enables use in economy class in aircraft. This object is achieved by a seat with the features of claim 1 in its entirety.

In that, as specified in the characterizing part of claim 1, the coupling means has at least one control part, which can be actuated by way of movement of the backrest and/or the seat base, and in the process at least via another control part moves the seat base and/or the backrest between the indicated positions, an adjustment motion, especially a tilting motion of the backrest is coupled to a synchronous adjustment motion of the seat base which is lowered preferably in the rear transition region to the backrest by a definable amount relative to the front edge of the seat, which simultaneously slides forward to increase the seat depth. The latter position corresponds to a comfort position which enables resting or relaxation for the seat occupant, his being relieved of the seat work especially by the support in the forward resting region of the legs by the raised front edge of the seat.

By preference, the seat according to the invention forgoes additional adjustment means such as triggerable actuators, in order to move from an upright backrest position such as corresponds to the taxiing, takeoff, and landing position (TTL position) within an aircraft into the comfort or rest position, that is, into the traveling position, with a tilted backrest and vice versa, but rather solely by slight use of the bodily forces of the seat occupant for the purpose of a forward and backward sliding motion the seat part in addition to the respective seat base is moved, then the backrest following analogously in the tilt position via the indicated coupling means. This analogous adjustment motion can additionally be supported by the back of the seat occupant pressing against the backrest or by relieving it respectively in the righting motion for a rear tilt adjustment.

In this respect, the seat can be made economically and reliably, and in an expansion of the seat program the seat according to the invention, for the purpose of further increasing comfort, could also have the corresponding actuator in order in this way to effect the respective adjustment via correspondingly conventional control means. But since the application in economy class is to be covered with the seat, for reasons of weight and with respect to the lack of installation and assembly space, preferably this further configuration is omitted.

By preference, the coupling means is a connecting rod drive with pairs of connecting rods which can be located in a space-saving manner underneath the seat base and which can traverse relatively large adjustment distances with small actuating forces. These connecting rod drives with respect to the prescribed requirements for stability have proven more than suitable in the event of a possible crash. If, for an especially preferred embodiment of the seat solution according to the invention, the connecting rods of the respective connecting rod drive in each position of motion overlap a hollow section-like support body as part of the base structure, with which the seat can be erected on the deck or floor, a very stiff seat mounting structure is thereby achieved and this solution takes up little installation space so that underneath the support body space is created, for example as storage space, suited for holding articles of luggage or the like. The installation space is also available in this way for holding a life vest or the like.

By preference, provision is furthermore made in the seat according to the invention so that with the rear tilt setting of the backrest and with the bodily force of the seat occupant an energy storage device (gas-lock or hydro-lock) is charged which, for the opposite righting motion of the backrest into the TTL position, supports this righting motion and thus relieves the seat occupant.

In the solution according to the invention, it has proven especially favorable in the configuration of the coupling means to establish a definable angle ratio which is intended to dictate within defined limits, the ratio of the change of the tilt of the backrest effected in the process relative to the change of the tilt of the seat base. In particular, angle ratios of 1:1 to 5:1, but especially preferably within the range of 2:1 to 4:1, can be defined. These angle ratios yield a favorable application of force in movement of the seat by bodily forces. In this way the length adjustment can be defined relative to the front edge of the seat base, and changes in length in the region of a few centimeters, preferably about 2.5 cm, can thus be defined.

The seat according to the invention will be detailed below using one embodiment as an aircraft passenger seat. The figures are schematic and are not drawn to scale.

Figure 2:
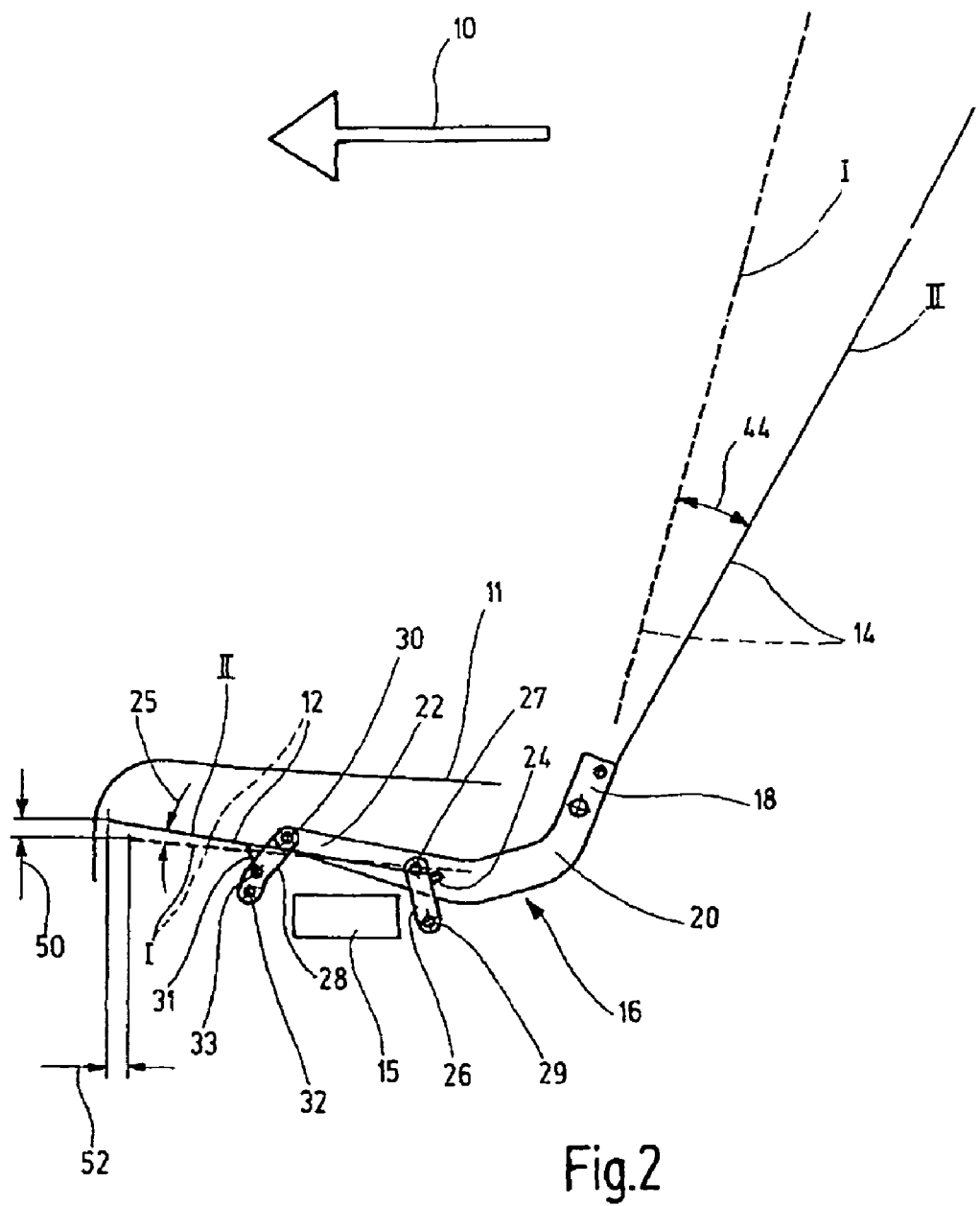

FIG. 1 shows in a side view the seat with the coupling means in the initial position I and FIG. 2 shows the seat shown in FIG. 1 in a comfort position II with the initial position I indicated by the broken line.

FIG. 1 shows in a schematic side view the components of a seat which are essential for the solution according to the invention in an initial position I which is shown by the broken line in FIG. 2. This initial position I shows the adjustment of the seat as is preferred for taxiing, taking off and landing (TTL position). The direction of motion of the aircraft is shown in FIG. 1 symbolically with an arrow 10. When in the following explanations a "front" and a "rear" part of the seat are addressed, this means that the "front" part in the direction of motion 10 is located in front of the "rear" part. Only components of the seat which are essential for the explanation are shown in the figures. Thus, among other things, the seat covering 11 analogously to the top of the seat cushion part is indicated only in sections. Furthermore the seat base 12 and the backrest 14 in the side view are indicated only schematically as a line representation. The basic structure required for the installation of the seat in an aircraft for erecting the seat relative to the cabin deck, which is not shown, is represented only by one of its components, specifically a hollow section-like support body 15 as a support rail. The coupling means designated as a whole as 16 is used for coupling the adjustment of the motion of the seat component backrest 14 to the seat component seat base 12.

Proceeding from the upper region of the backrest 14 near the head, said region is coupled in its lower, rear, end region 18 which faces the seat base 12 to an angle lever 20 which belongs to the coupling means 16, the coupling of the backrest 14 at this point being made rigid.

Other components of the coupling means 16 are detailed below advancing and proceeding from the rear end region 18 of the angle lever 20 to its front end region 22. The angle lever 20 here runs first of all in the direction of the backrest 14 following downward, in order then to undergo transition into a longer front end region 22 which is tilted slightly forward. This transition takes place via two corresponding bends between the front and rear end region 22, 18. The rear edge of the seat base 12 is coupled via an axis of rotation 24 to the angle lever 20, by which a tilt change 25 of the seat base 12 shown in FIG. 2 relative to the cabin floor or deck as a surface for becoming upright is possible.

In front of the axis of rotation 24, that is, in the direction of the front part of the seat, there is a rear connecting rod 26 which is coupled to the angle lever 20 by means of a pivot joint 27. The other end region of the connecting rod 26 is supported in a fulcrum 29 which is pivot-connected to the base structure of the seat relative to it. Another front connecting rod 28 is coupled in the front end region 22 of the angle lever 20 on the front pivot joint 30, on the end which has the pivot joint 30, the front connecting rod 28 being bent at a right angle in the direction to the rear connecting rod 26. In the region of the bend of the front connecting rod 28 which belongs to this bend, a rod-like coupling part 31 as part of the coupling means 16 acts on a corresponding articulation point 33—also in the form of a hole or the like—of the front connecting rod 28. With its other free end the coupling part 31 acts on the underside of the seat base 12 and in this way is connected to it. Furthermore, viewed in the direction of looking at FIG. 1 the lower end of the front connecting rod 28 is coupled to another fulcrum 32 of the base structure.

The coupling part 31 accordingly acts on the lower side of the seat base 12 and thus next to the axis 24 of rotation establishes a coupling between the coupling means 16 and the seat base 12 as a whole. Furthermore the two indicated connecting rods 26, 28 as parts of a pair of connecting rods form a so-called connecting rod drive as a pivoting-movement gear train for the seat base 12 in addition to the backrest 14. The described coupling means 16 is preferably located on the edge side on the two ends of the seat; for the corresponding design, however, it is also possible to arrange this coupling means 16 only on one side or for example in the middle region of the seat base 12 underneath it. As stated in the foregoing, the coupling part 31 is guided to pivot around its receiver in the front connecting rod 28 and the coupling part 31 is fixed in the direction of motion 10 on the seat base 12 by way of a link-pivoting guide which is not shown, such that in fact no relative displacement in the axial direction between the coupling part 31 and the seat base 12 takes place. Nevertheless rotary motion of the coupling part 31 with respect to the seat base 12 is enabled, for example, by the free end of the coupling part 31 being guided in a bushing or pivoting sleeve of the indicated pivoting guide, which sleeve is not detailed. Thus the pivoting of the coupling part 31 counterclockwise relative to its initial position I in FIG. 1 can effect at least displacement of the front edge of the seat base 12 in the direction of motion 10.

These adjustment options will be detailed in FIG. 2.

FIG. 2 shows the seat which has already been described from FIG. 1 in the initial position I shown by the broken line together with the already explained coupling means 16. To avoid repetition, accordingly the same parts as shown in FIG. 2 which were already explained in FIG. 1 are not described again, but are provided with the same reference numerals. The seat shown in FIG. 2 is shown with its backrest 14, the coupling means 16 and the seat base 12 not only in the initial position I which corresponds to FIG. 1, but additionally in the desired comfort position II. In this respect the solid lines of the drawings relate to the comfort position II.

A change in the tilt 44 of the backrest 14 to the rear is executed in the transition from the initial position I to the comfort position II, using the coupling means 16 likewise the tilt change 25 of the seat base 12 being effected such that in the rear part of the seat base 12 it is lowered and in the region of the front edge of the seat, raising or an increase in height by a distance 50 takes place. At the same time and synchronously with the rear tilt setting of the backrest 14, the seat depth increases and accordingly the seat depth is set, with this increase being designated as 52 in FIG. 2. In this comfort position II the coupling part 31 is pivoted counterclockwise forward, this motion being triggered via the connecting rod drive which together with the axis of rotation 24 causes motion forward in the sense of restricted guidance. In the embodiment shown in FIG. 2, the seat depth can be increased by 2 to 3 cm and the height 50 can be increased in the region of the front edge of the seat by approximately 2 cm. For the illustrated embodiment the angle ratio of the tilt change 44 of the backrest 14 to the tilt change 25 of the seat base 12 is approximately 3.5, the tilt change 44 of the backrest 14 being approximately 14° and the tilt change 25 of the seat base 12 being approximately 4°, each relative to its location in the initial position I.

The two figures show the space-saving structure of the coupling means 16 which with the connecting rod drive overlaps the top of the support body 15 and thus requires little installation space. This configuration also satisfies increased crash requirements since the connecting rod drive can be suitably supported on the support body 15.

Using FIG. 2, the function of the coupling means 16 according to the invention will now be detailed. Proceeding from the initial position I (TTL position), a seat occupant who wishes to move into comfort position II, first in particular with his shoulder region applies pressure to the backrest 14 and combines this with an advancing motion of the rest of his body in the direction of the arrow 10. By this application of force via the rotating and articulated sites, the connecting rod drive is pivoted from its position shown in FIG. 1 forward as shown in FIG. 2, in particular, the front connecting rod 28 being set upright. Because the angle lever 20 is tilted clockwise along its rear end region 18 and down, pivoting around the axis 24 of rotation, the seat base 12 in the back region is lowered at the same time and the front edge of the seat is raised by the path 50. At the same time there is displacement by the distance 52 forward. For a resetting motion into the initial position I the sequence of motion can be reversed and the righting motion of the backrest 14 can be supported via an energy storage means which is not shown, for example in the form of a so-called hydro-lock or gas-lock. Adjusting means such as these which support physical forces are conventional in seat building in aircraft, so that they are not detailed now. In the embodiment shown in FIGS. 1 and 2 only the end positions I and II are addressed. But it is also possible to provide intermediate positions which can be locked between the end positions I and II, for example by means of the indicated lock-means (see in this respect also WO 02/16161 A). In this way comfort positions can be achieved with a very widely drawn framework.

As is to be seen especially in FIG. 1, in the initial position I the front connecting rod 28 with the coupling part 31 is "folded in" such that as a result of its right-angle bend in a slightly tilted path it undergoes transition into the largely horizontally aligned front end region 22 of the angle lever 20 which is supported to the rear and before reaching the transition to the rear end region 18 from the raised other connecting rod 26 of the connecting rod drive. In this way, on the front pivot joint 30 there is a type of overcentering which, with the seat locked, counteracts centrifugal forces in the direction of the arrow 10 in order to keep the seat in the upright initial position I even in extreme situations, such as in a turbulent flight or in the event of a crash. In spite of this overcentering it is surprising that with relatively little bodily force the seat occupant can assume the comfort position II as shown in FIG. 2, in which he puts the front connecting rod upright 28, which then forms a type of overlapping support bridge for the seat base 12 relative to the support body 15 with the rear connecting rod 26 and the front end region 22 of the angle lever 20. Since both the axis of rotation 24 in each tilt setting in the axial direction is located tightly adjacent to the pivot joint 27, and the action point of the coupling part 31 on the seat base 12 remains firmly in the influence region of the front connecting rod 28, altogether a connecting rod drive is formed which works on the one hand very stably and reliably and on the other hand only small actuating forces are required which, however, can be applied in directions other than the application of centrifugal force which may occur in the event of a crash.

The invention claimed is:

1. A passenger seat comprising:
a seat base;
a backrest;
a seat structure for erecting the seat on a floor; and
at least one coupling device for coupling a movement of the seat base and a movement of the backrest between an initial position of the seat and at least one comfort position of the seat and vice versa, wherein
the backrest moves from the comfort position to the initial position in a travel direction; and
the coupling device includes:
at least one control member, which can be actuated by movement of the backrest or of the seat base, wherein movement of the backrest moves the seat base and movement of the seat base moves the backrest, between the initial position and the at least one comfort position, the control member includes at least one angle lever, one end of which is rigidly coupled to the backrest, and wherein the angle lever provides a pivot axis about which the seat base is pivotally supported and wherein the pivot axis, at which the seat base is supported by the angle lever, moves downward and in the travel direction when the seat base and the backrest are moved from the initial position to the comfort position; and
at least one mechanical drive that includes a plurality of coupling locations for connecting the angle lever to the seat structure, and the angle lever is supported at least two coupling locations of the plurality of coupling locations, and the at least two coupling locations of the plurality of coupling locations are moved relative to the seat structure during a movement of the backrest and the seat base between the initial position and the at least one comfort position of the seat and vice versa, and wherein the at least two coupling locations of the plurality of coupling locations are moved along with the angle lever during the movement of the backrest and the seat base between the initial position and the at least one comfort position of the seat and vice versa, and
at every stage of the movement of the seat base and the backrest, one of the plurality of coupling locations is a rearmost coupling location with respect to the travel direction, and the pivot axis, at which the seat base is supported by the angle lever, is located such that, during movement of the seat base and the backrest between the initial position of the seat and the at least one comfort position, the pivot axis lies behind the rearmost coupling location.

2. The seat according to claim 1, wherein in any state of motion between the initial position of the seat and the at least one comfort position, the coupling locations have an invariable distance among one another.

3. The seat according to claim 1, wherein the coupling device includes at least one coupling member, and the seat base can be tilted by the coupling member about the pivot axis at the angle lever about which the seat base is pivotally supported.

4. The passenger seat according to claim 1, wherein a tilt angle of the seat base that is formed between the seat base and the travel direction is increased by a movement of the seat base and the backrest from the initial position of the seat to the at least one comfort position of the seat.

5. The passenger seat according to claim 1, wherein
the plurality of coupling locations is formed by at least one pair of connecting rods,
each connecting rod has a first end and a second end, and the first end is opposite to the second end,
the first end of each of the connecting rods is pivotally connected to the angle lever, and
the second end of each of the connecting rods is pivotally coupled to the seat structure.

6. The passenger seat according to claim 5, wherein
in the initial position, the connecting rods of the at least one pair of connecting rods are tilted toward the backrest, and
in the comfort position, one of the connecting rods of the at least one pair of connecting rods is tilted toward the other connecting rod of the at least one pair of connecting rods.

7. The seat according to claim 5, wherein, as viewed from a side of the seat, in the initial position of the seat base and the backrest, one of the connecting rods of the pair of connecting rods is bent toward the other connecting rod of the pair of connecting rods.

8. The seat according to claim 5, wherein the connecting rods of the mechanical drive and a portion of the angle lever between the coupling locations, in each position of the mechanical drive, provide clearance for a cross-beam, which is a part of the seat structure and which is arranged perpendicular to the travel direction.

9. The passenger seat according to claim 5, wherein in the initial position of the seat base and the backrest, at least one of the connecting rods of the at least one pair of connecting rods is coupled to the angle lever and the seat structure, at coupling locations that are arranged such that a line that connects the coupling locations is tilted, with respect to a plane that is perpendicular to the travel direction, in a direction opposite to the travel direction, by at least 45°.

10. The passenger seat according to claim 1, wherein, in a state in which the one end of the angle lever is rigidly coupled to the backrest, the other end of the angle lever and the backrest form two rays of an angle, the magnitude of which is at least 90 degrees.

11. The passenger seat according to claim 1, wherein the angle lever is pivotally supported at the at least two coupling locations of the plurality of coupling locations.

* * * * *